Feb. 1, 1944.   T. McG. AIKEN   2,340,573
CAMERA DIAPHRAGM
Filed March 21, 1941   2 Sheets-Sheet 1
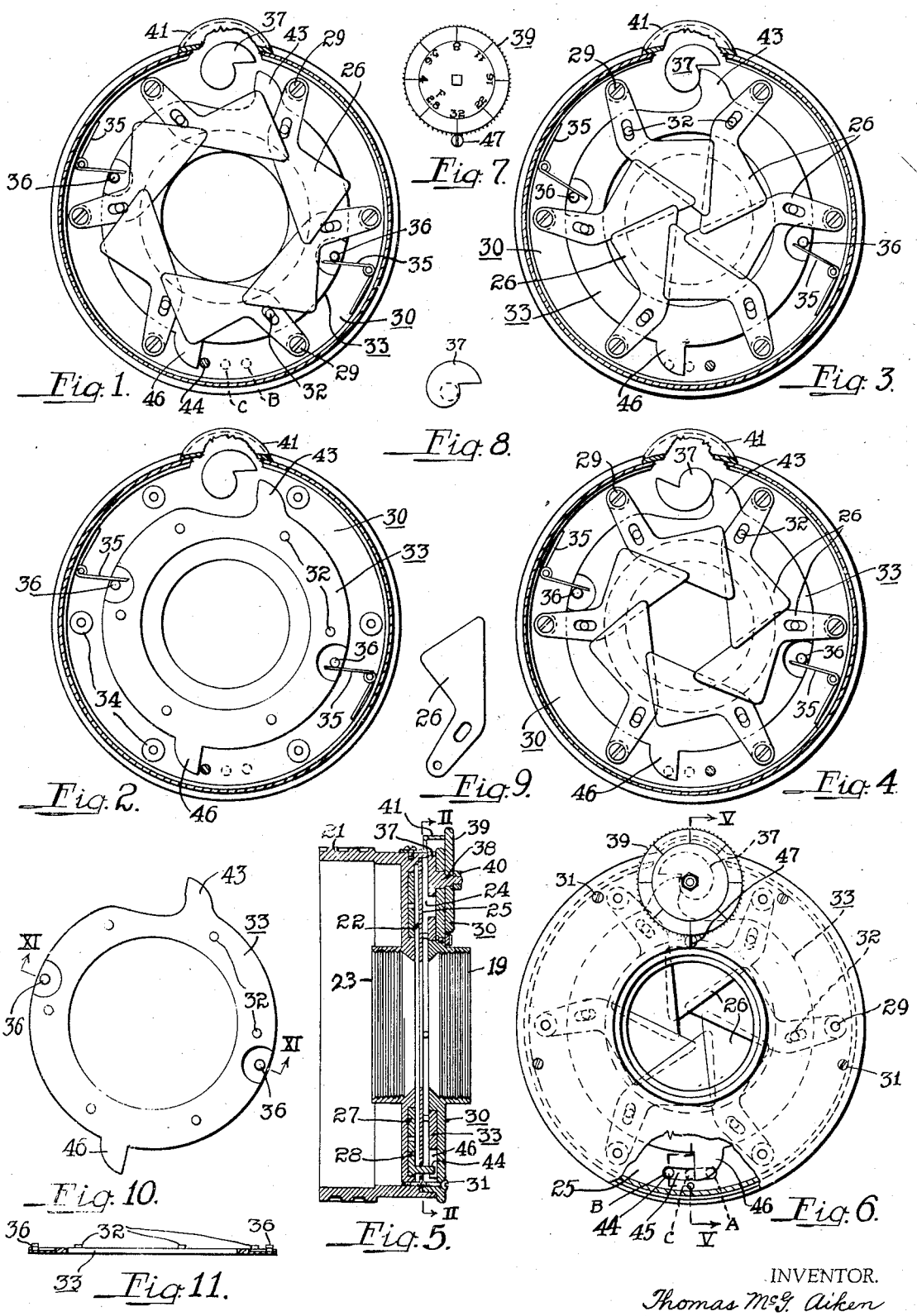
INVENTOR.
Thomas McG. Aiken
BY Archworth Martin
His Attorney Feb. 1, 1944.   T. McG. AIKEN   2,340,573
CAMERA DIAPHRAGM
Filed March 21, 1941   2 Sheets-Sheet 2

INVENTOR.
Thomas McG. Aiken
BY Archworth Martin
His Attorney

Patented Feb. 1, 1944

2,340,573

UNITED STATES PATENT OFFICE 2,340,573

CAMERA DIAPHRAGM

Thomas McG. Aiken, Pittsburgh, Pa.

Application March 21, 1941, Serial No. 384,434

12 Claims. (Cl. 95—64)

My invention relates to diaphragms for use with camera shutters, and more particularly to a diaphragm that automatically closes to preselected stop.

In many cases where photographers are making pictures, they open the shutter for focusing and open the diaphragm to increase the light for focusing, then close the shutter and make the exposure, forgetting to reduce the diaphragm to the proper stop for correct exposure of the plate. This is a very common error among many photographers.

One object of my invention is to provide means whereby the diaphragm is automatically closed to a desired stop after focusing, and before the exposure is made.

Another object is to provide a diaphragm that can be adjusted to any desired exposure opening, then opened to a larger extent, to admit more light when the shutter is opened for focusing and which is automatically closed to pre-selected adjustment of stop when the shutter is closed after focusing.

Still another object of my invention is to focus the view with diaphragm stop to be used in making the picture and to also further focus with larger stop and having the diaphragm automatically return to the pre-selected opening when the shutter is closed.

A still further object of my invention is to provide a diaphragm that can be opened to admit more light for focusing and which will automatically be reduced to a pre-selected stop at the very fast speed which is necessary in my reflex camera application Serial No. 384,435, filed March 21, 1941.

Figure 16:
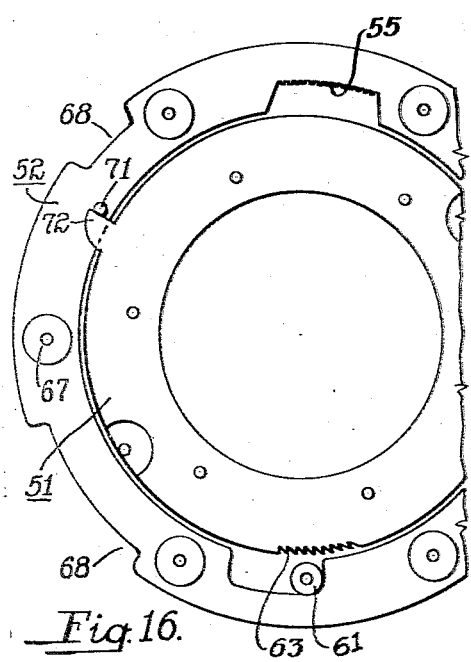
Figure 12:
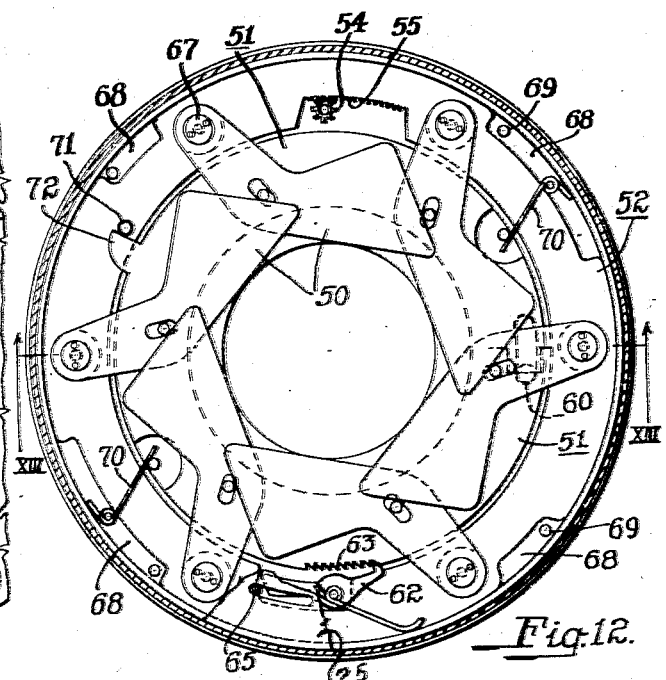
Figure 13:
Figure 14:
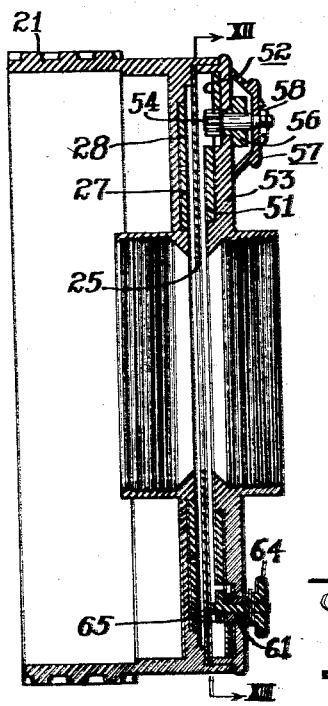
Figures 15, 17, 18:
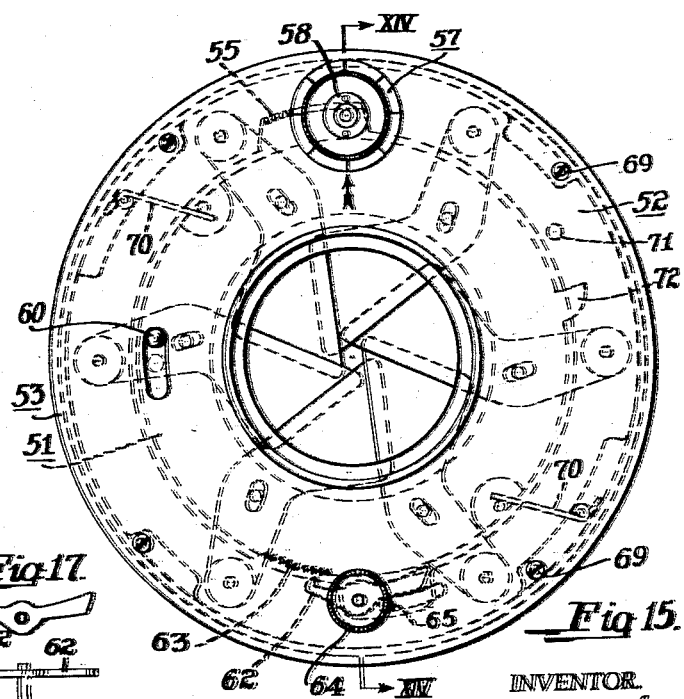

In the accompanying drawings, Figure 1 is a view looking at the rear faces of the diaphragm and certain of the operating elements therefor, with the diaphragm open; Fig. 2 is a similar view taken on the line II—II of Fig. 5, with the diaphragm wings removed; Fig. 3 shows the wings of Fig. 1 at a closed position; Fig. 4 shows the wings at a somewhat wider stop position than Fig. 3; Fig. 5 is a view taken on the line V—V of Fig. 6; Fig. 6 is a front view of the apparatus of Fig. 5; Fig. 7 is a face view of the stop indicator of Fig. 6; Fig. 8 shows the stop adjustment element of certain of the other figures; Fig. 9 shows one of the diaphragm wings removed from the mechanism; Fig. 10 is a rear face view of the actuating ring for the diaphragm; Fig. 11 is a view taken on the line XI—XI of Fig. 10; Fig. 12 is a rear face view of a modification of the structure of Fig. 1 and looking in the direction of the arrows XII—XII of Fig. 14; Fig. 13 is a view taken on the line XIII—XIII of Fig. 12; Fig. 14 is a view taken on the line XIV—XIV of Fig. 15; Fig. 15 is a front view of the structure of Fig. 14; Fig. 16 is a view similar to Fig. 12, but with certain of the parts removed; Fig. 17 is a view showing the latch of Fig. 15, and Fig. 18 is a plan view of the latch and the manually operable tripping member therefor.

In the drawings I show diaphragm mechanism that is particularly adapted for use with the shutter mechanism of either my application Serial No. 384,435 filed March 21, 1941, or the mechanism in Figs. 18 to 23 of my Patent No. 2,168,893, issued Aug. 8, 1939, although the invention is capable of use with other forms of shutter-operating mechanism. Only so much of the shutter mechanism is shown in the accompanying drawings as is necessary to explain the present invention.

Referring first to Figs. 1 to 11, I show a shutter case 21 having front and rear lens-holding portions 19 and 23. Relatively-movable rings 27 and 28 are provided for oscillating shutter blades (not shown) as in my said previous inventions, a space 22 being provided for such blades. In the space 24 forwardly of a plate 25, diaphragm wings 26 are positioned. These wings are pivotally connected by screws 29 to a fixed end plate 30 held in place by screws 31, and have slots through which extend studs 32 that are carried by an oscillatory ring 33 which lies against the end plate. When the ring 33 is oscillated the diaphragm wings will be opened and closed as hereafter explained. Washers 34 of the thickness of the ring 33 serve as spacers against which the screws hold the pivoted ends of the wings. While six diaphragm wings are here shown, a greater or less number can be employed.

Springs 35 carried by the end plate 30 bias the ring 33 from open or focusing position (Fig. 1) to stop position as in Figs. 3 and 4, for example, the springs being tensioned by studs 36 on the ring 33 when it is turned to open the diaphragm for focusing. An adjustable stop member is provided for limiting the stop position of the diaphragm wings at the time of making an exposure, that is, the extent to which the diaphragm wings will be closed. This member is in the form of a cam-like disc 37 that carries a stud 38 which is rotatable in the end plate 30 and has rigidly secured thereto a dial 39 which is held in place by a nut 40, so that the dial and the disc 37 can be rotated as a unit. A curved shield plate 41 is carried by the shutter casing 21 and overlies the member 37.

The stop member 37 at its various adjusted positions limits the extent to which the diaphragm wings 26 can be moved toward closed position by their springs 35 and hence determines the area of diaphragm opening. For example, in Figs. 3, 6 and 7 the member 37 is shown as set to permit the wings to be moved to a lower or smaller stop position, whereas in Fig. 4 the setting of the member 37 is such that there is a much wider opening through the diaphragm at the time of exposure. The dial 29 has graduations on its face to serve as a guide to the photographer in setting the stop position of the diaphragm wings. The ring 33 is provided with a shoulder 43 that engages with the member 37 when the wings 26 are moved toward closed position.

When setting the shutter under tension for the operation of taking a picture through movement of the shutter rings 27 and 28 as described in my said application, these rings are placed under tension, and latched so that when the outer ring is released it will open the shutter and trip the outer ring to allow it to close the shutter. As further described in said application, the inner ring 28 of the present application, after tensioning of the rings for a shutter operation (at which time the shutter is closed), can be moved past its normal tensioned position (at C, Fig. 6), to open the shutter at position A, for focusing. During this movement of the ring 28, a stud 44 that is carried thereby and which extends through a slot 45 in the partition 25, engages a shoulder 46 on the diaphragm ring 33 as shown in Fig. 1, to move the diaphragm to wide-open position. After the focusing is completed the shutter ring is returned to its former tensioned position at C. This movement tends to move the stud 44 from the shoulder 46, allowing the diaphragm ring 33 to be moved by its springs 35 toward the stop position at which the shoulder 43 engages the disc 37. When the diaphragm 33 has been brought toward its stop position, the ring 28 can be tripped and will thereupon continue its movement uninterruptedly and the stud 44 will be carried away from engagement with the shoulder 46, the stud eventually coming to rest at point B (Figs. 1 and 6) and the shoulder 46 coming to rest at an intermediate point C or some point adjacent thereto, depending upon the setting of the stop member 37. In any event, the diaphragm wings will have reached their stop position at the time the rings 27 and 28 reach that stage of their operation where the shutter is opened and closed for an exposure.

Referring now to Figs. 12 to 18, I show a somewhat different arrangement, wherein the diaphragm wings are opened manually, independently of the movement of the shutter rings 27 and 28, after the shutter is opened, but wherein the diaphragm wings are automatically moved to an adjustable stop position through shutter-operating movement of the ring 28. In this arrangement, the diaphragm wings 50 have pin and slot connection with an oscillatory ring 51 as in the case of the members 26 and 33 of Figs. 1 to 6, but the outer ends of the wings have pivotal connection with an adjustable collar 52 instead of with a fixed collar as in the previous form. The collar 52 is rotatably adjustable in the end plate 53 of the shutter casing by a pinion 54 which meshes with rack teeth 55 on the collar. The shaft for the pinion 54 is rigidly connected therewith and extends through a bushing 56 in the end plate 53 and a dial button 57 is rigidly connected to the outer end of the shaft, being firmly held thereon by a nut 58. The nut 58 is turned down with sufficient force to provide desired frictional resistance to the turning of the pinion 54. The button 57 is knurled or serrated on its edge and provided with graduated marks as in the case of the dial 39. The extent to which the diaphragm wings are moved in a closing direction is dependent upon the final relative positions of the ring 51 and the collar 52, and hence upon the setting of the rack 55.

The ring 51 carries a stud or handle 60 that extends through a slot in the front wall or plate 53. With the shutter in open position, when this handle is moved downwardly from the position shown in Fig. 15, the ring 51 will be swung in a direction to move the diaphragm wings to their open position, the ring 51 being held in such position by a spring-pressed latch 62 engaging with teeth 63 in the periphery of the ring 51, these teeth permitting the diaphragm wings to be set at various opening widths. The shaft of the latch extends through a bushing 61 that is mounted in the end plate 53 and which serves as a bearing for the latch shaft, and the bushing extends through a cut-out portion of the collar 52, thus serving also as a stop for limiting rotative adjusting movements of the collar 52. A turn button 64 is provided for the purpose of manually tripping the latch 62 to release the diaphragm and permit of rechecking the diaphragm opening to be used for exposure. When the diaphragm has again been opened for focusing and the shutter ring 28 is released for closing the shutter and making the exposure, the latch will be automatically tripped by a stud 65 which is carried by the shutter ring. Such tripping is effected to cause closure of the diaphragm simultaneously with the shutter blade closing as in the other arrangement. The plate 25, which is fragmentarily shown in Fig. 12, has a slot through which the stud 65 extends.

In setting the stop position for the diaphragm, the pinion 54 is turned as above indicated to shift the collar 52. When the collar is turned in a counter-clockwise direction from the position indicated in Fig. 12, the pivot points 67 of the wings 50 are shifted, so that the handle 60 in passing to the upward limit of movement in its slot will not close the wings to the small stop position shown in Fig. 15. The frictional resistance on the pinion 54 to turning movement will be sufficient to prevent accidental turning movement thereof during operation of the diaphragm ring 51. The edge of the collar 52 is cut away at points 68 to permit movement thereof relative to screws 69 that hold the face plate 53 in position and to accommodate the outer portions of the diaphragm-actuating springs 70 and their supporting studs that are secured to the inner side of the face plate. A stud 71 on the collar 52 engages with a shoulder 72 on the ring 51 near one extreme position of adjustment of the ring, so that in case the pinion is turned too far in that direction, an undue strain will not be imposed upon the diaphragm wings. For example, if the dial 57 is so set that the diaphragm wings are at a mid point adjustment, the depression of handle 60 midway of its slot will complete the diaphragm movement to full opening. At this point, the shoulder 72 engages the stud 71.

Assuming that the diaphragm has been operated for focusing, as shown in Fig. 12, and the shutter rings 27 and 28 moved to a set position with the shutter open for focusing, release of the shutter ring 28 will carry its stud 65 into engagement with the nose of the latch 62 (Fig. 12), to trip the latch and release the diaphragm ring 51, so that the wings 50 will be closed to their predetermined stop position and such movement immediately followed by actuation of the shutter.

It will be understood that this diaphragm structure can be used with shutters of various known forms.

I claim as my invention:

1. The combination in a shutter unit of the between-the-lens type having an element movable to open and close shutter blades, of diaphragm wings normally maintained under closing tension, a stop member limiting diaphragm movement in a closing direction, a member movable to open the wings against said tension, means for releasably maintaining the diaphragm wings in open position, and means carried by the said element and effective simultaneously with movement of said element toward closed shutter position, to release the diaphragm wings for closing movement to said stop member, the unit being selfcontained and adapted for connection to the lens-supporting frames of focusing cameras.

2. The combination in a shutter unit of the between-the-lens type having an element movable to open and close shutter blades, of diaphragm wings normally maintained under closing tension, stop means limiting closing movement of the wings, a member movable to open the diaphragm wings, a latch for releasably maintaining the said member in open diaphragm position, and a projection on the said element, for tripping the latch during movement of the element to closed shutter position, to thereby release the diaphragm wings for closing movement to said stop means, the unit being selfcontained and adapted for connection to the lens-supporting frames of focusing cameras.

3. The combination in a shutter unit of the between-the-lens type having an element movable to open and close shutter blades, of diaphragm wings normally maintained under closing tension, a stop means limiting closing movement of the wings, a member movable to open the diaphragm wings, and a projection on the said element, in position to engage the said member during movement of the element to open shutter position, to open the wings against said tension, the projection being movable away from the said member during movement of the said element toward closed shutter position, whereby the diaphragm wings will move to said stop means during closing of the shutter.

4. The combination in a shutter unit of the between-the-lens type having an element movable to open and close shutter blades, of diaphragm wings normally maintained under closing tension, stop means limiting closing movement of the wings, a member movable to open the diaphragm wings, a latch device for releasably maintaining said member at positions for selected aperture widths of diaphragm opening, and means actuated during shutter-closing movement of said element, for tripping the latch, to thereby permit closing of the diaphragm wings to said stop means, the unit being selfcontained and adapted for connection to the lens-supporting frames of focusing cameras.

5. The combination in a shutter unit of the between-the-lens type having an oscillatory ring element movable to open and close shutter blades, pivotally mounted diaphragm wings normally maintained under closing tension, stop means limiting closing movement of the wings, an oscillatory ring member for rocking the wings on their pivots to open and close the diaphragm wings, a projection on the said element in position to rock the said member in a direction to effect opening of the diaphragm wings when the element is being moved in a direction to open the shutter, the said projection being moved to release the said member during shutter-closing movement of the element, to thereby release the diaphragm wings for closing movement to said stop means.

6. The combination in a shutter unit of the between-the-lens type having an oscillatory ring element movable to open and close shutter blades, pivotally mounted diaphragm wings normally maintained under closing tension, stop means limiting closing movement of the wings, an oscillatory ring member for rocking the wings on their pivots to open and close the diaphragm wings, a latch for releasably maintaining said member in position to hold the diaphragm wings open, and a projection on the said element in position to trip the latch during movement of the element to closed shutter position, to thereby release the diaphragm wings for closing movement to its stop means, the unit being selfcontained and adapted for connection to the lens-supporting frames of focusing cameras.

7. The combination with a camera shutter casing and an element movable in the casing, to open and close shutter blades, of diaphragm wings mounted in the casing, a member movable in the casing to operate the diaphragm wings, and means movable with the said element and engageable with the said member when moving in one direction, whereby operation of the diaphragm wings is automatically effected upon movement of said element in said one direction.

8. The combination with a camera shutter casing and an element movable in the casing, to open and close shutter blades, of diaphragm wings mounted in the casing, a member movable in the casing to operate the diaphragm wings, and means operated by the said element and having engagement with said member and so arranged that operation of the diaphragm wings is automatically effected upon movement of said element in either direction.

9. A camera shutter case of tubular form with means for holding a lens, and adapted to contain shutter blades of the iris type, a ring-like element mounted in the case for oscillation about the axis of the case and having means thereon for opening and closing shutter blades during said oscillation, diaphragm wings of the iris type contained within the case and provided with means for normally maintaining them under closing tension, a ring in the case mounted for oscillation about the axis of the case and having connection with the wings, to open and close them, a stop member for limiting diaphragm-closing movement of the ring, means for releasably maintaining the second-named ring in position to hold the diaphragm wings in open position, and an element carried by the first-named ring for releasing the second-named ring during movement of the first-named ring, in its shutter-closing direction, whereby the diaphragm will automatically be moved to its stop position.

10. A camera shutter case of tubular form with means for holding a lens, and adapted to contain shutter blades of the iris type, a ring-like element mounted in the case for oscillation about the axis of the case and having means thereon for opening and closing shutter blades during said oscillation, diaphragm wings of the iris type contained within the case and provided with means for normally maintaining them under closing tension, a ring in the case mounted for oscillation about the axis of the case and having connection with the wings, to open and close them, a stop member for limiting diaphragm-closing movement of the ring, a latch for maintaining the second-named ring in position to hold the diaphragm wings in open position, and a tripping element carried by the first-named ring for releasing the latch during movement of the first-named ring in its shutter-closing direction, whereby the diaphragm will automatically be moved to its stop position.

11. A camera shutter case of tubular form with means for holding a lens, and adapted to contain shutter blades of the iris type, a ring-like element mounted in the case for oscillation about the axis of the case and having means thereon for opening and closing shutter blades during said oscillation, diaphragm wings of the iris type contained within the case and provided with means for normally maintaining them under closing tension, a ring in the case mounted for oscillation about the axis of the case and having connection with the wings, to open and close them, a stop member for limiting diaphragm-closing movement of the ring, and a connection between the said rings so arranged that during movement of the first-named ring in shutter-opening direction the second-named ring will be moved to open the diaphragm wings against their closing tension, and upon movement of the first-named ring in shutter-closing direction the second-named ring will be released for movement of the diaphragm wings to its stop position.

12. A camera shutter case of tubular form provided with means for holding a lens and adapted to contain shutter blades, an element mounted for oscillatory movement in the case and adapted for connection with the blades to open and close them, diaphragm wings of the iris type contained within the case and provided with means for normally maintaining them under closing tension, a member mounted for oscillatory movement in the case and having connection with the wings, for moving them to open position against said tension, a stop device limiting the extent of diaphragm movement toward closed position, means for releasably maintaining the said member in position to hold the diaphragm wings in wide-open position against said tension while the said element is held in a position at which the blades are open, whereby a focusing operating can be effected with the diaphragm wings fully open, and means actuated by movement of said element from its last-named position to a position at which the shutter is closed, for releasing the said member, whereby the diaphragm will automatically be closed to its stop position.

THOMAS McG. AIKEN